United States Patent
Hu et al.

(10) Patent No.: US 10,484,171 B2
(45) Date of Patent: Nov. 19, 2019

(54) METHOD FOR EFFICIENT AND PRACTICAL KEY DISTRIBUTION IN NETWORK CODING SYSTEMS

(71) Applicant: International Business Machines Corporation, Armonk, NY (US)

(72) Inventors: Xin Hu, White Plains, NY (US); Wentao Huang, Pasadena, CA (US); Jiyong Jang, White Plains, NY (US); Theodoros Salonidis, Boston, MA (US); Marc Ph Stoecklin, White Plains, NY (US); Ting Wang, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 161 days.

(21) Appl. No.: 15/185,743

(22) Filed: Jun. 17, 2016

(65) Prior Publication Data
US 2017/0366341 A1    Dec. 21, 2017

(51) Int. Cl.
*G06F 21/00* (2013.01)
*H04L 29/06* (2006.01)
*H04L 9/08* (2006.01)
*H04L 9/30* (2006.01)

(52) U.S. Cl.
CPC ............ *H04L 9/083* (2013.01); *H04L 9/0861* (2013.01); *H04L 9/304* (2013.01); *H04L 63/062* (2013.01)

(58) Field of Classification Search
CPC .......................... H04L 9/0819; H04L 9/0869
See application file for complete search history.

(56) References Cited

PUBLICATIONS

Huang, Wentao, et al., "Rateless and Pollution-Attack-Resilient Network Coding", 2015 IEEE International Symposium on Information Theory (ISIT), Conference, Hong Kong, Jun. 14-19, 2015, pp. 2623-2627, presented Jun. 19, 2015.

*Primary Examiner* — Lisa C Lewis
(74) *Attorney, Agent, or Firm* — Jeffrey S. LaBaw, Esq.; McGinn IP Law Group, PLLC (57) ABSTRACT

An encoder including a computer readable storage medium storing program instructions, and a processor executing the program instructions, the processor configured to generate a k-bit key, where k is a positive integer, estimate an upper bound of a number of eavesdropped links, encode each bit of the k-bit key using a random matrix of a selected rank, and transmit the encoded k-bit key through a network that performs linear operations on packets.

19 Claims, 9 Drawing Sheets

METHOD FOR EFFICIENT AND PRACTICAL KEY DISTRIBUTION IN NETWORK CODING SYSTEMS

CROSS REFERENCE TO RELATED APPLICATIONS

The present application is related to co-pending U.S. patent application Ser. No. 15/141,049, filed on Apr. 28, 2016, and U.S. patent application Ser. No. 15/141,082, filed on Apr. 28, 2016, the entire contents of which are incorporated herein by reference.

BACKGROUND OF THE INVENTION

Field of the Invention

The disclosed invention relates generally to a method and system for network coding, and more particularly, but not by way of limitation, relating to a system, apparatus, and method for efficient and practical key distribution in network coding systems.

Description of the Related Art

A source wishes to multicast information to a set of terminals over a network. The technique of network coding, i.e., allowing routers to mix the information in packets before forwarding them, is able to maximize network throughput, improve robustness against packet losses, and can be efficiently implemented in a distributed manner.

Compared to traditional routing, network coding imposes new security challenges. For example, an active adversary may easily corrupt the whole system as a single injected error packet may pollute many others in the process of mixing.

Numerous error control schemes have been proposed to address the above security challenges. Most of these schemes assume that secret keys are shared among the source and terminals and potentially the network nodes. In addition, secret keys are essential in providing other security properties such as secrecy and authentication. Existing key distribution schemes such as PKI (Public Key Infrastructure) or trusted third party (TTP) do not meet the requirements for network coding systems and have the drawback of requiring additional resources or infrastructure, or require collaboration from intermediate network codes. On the other hand, existing information theoretic key distribution schemes for network coding systems require prior knowledge on the capacity of the network, as well as prior knowledge on the number of network channels controlled by the adversary. These requirements are overly restrictive, e.g. estimating the network capacity can be costly, especially for large networks; the network capacity may change over time, such as users joining or leaving a P2P (peer-to-peer) network, and the number of channels controlled by the adversary is usually not known.

Therefore, there is need for providing a manner of addressing the problem of key distribution in a network coding system that is secure and reliable. There is also a need to provide key distribution in a network coding system that does not have overly restrictive requirements. There is also a need to have a key distribution scheme that can be used in a reliable multicast over a network in the presence of adversarial errors.

SUMMARY OF INVENTION

In view of the foregoing and other problems, disadvantages, and drawbacks of the aforementioned background art, an exemplary aspect of the disclosed invention provides a system, apparatus, and method of providing for a practical key distribution in network coding systems.

One example aspect of the disclosed invention provides an encoder including a computer readable storage medium storing program instructions, and a processor executing the program instructions, the processor configured to generate a k-bit key, where k is a positive integer, to estimate an upper bound of a number of eavesdropped links, encode each bit of the k-bit key using a random matrix of a selected rank, and transmit the encoded k-bit key through a network that performs linear operations on packets including both network coding operations and regular routing (store and forward) operations.

The encoder includes of generating a key matrix from a first matrix generated from the k-bit key and a second random matrix generated without the k-bit key. Each bit of information of the k-bit key is represented by a matrix. Depending on a state of a bit of the k-bit key, the bit is sent to either a full rank random matrix generator or a low rank zero matrix generator and produces a first matrix. The first matrix is combined with a second random matrix to produce a matrix of selected dimension and rank that represents the bit. The key matrix is constructed by concatenating the k matrices representing the k bits of the key. The encoder uses a universal secure network code to generate the encoded key. This step includes generating a parity check matrix of a maximum rank distance code, and multiplying it with a vector space isomorphism of the generated key matrix that represents the k-bit key.

Stated another way, the encoder generates k matrices from the k-bit key, i.e., one matrix is generated from each bit of the k-bit key. Depending on the value of the bit of the k-bit key, the matrix is either a high-rank matrix in which all entries are random, or a low-rank matrix in which a subset of selected entries are random and the remaining entries are zero. The encoder then uses a universal secure network code to generate a matrix representing the encoded k-bit key from the k matrices. This step includes: 1) apply a vector space isomorphism to the k matrices and view them as matrices with entries from a field of a larger size; 2) concatenate the k matrices; 3) generate a parity check matrix of a maximum rank distance code, and 4) multiply a variant of the parity check matrix to the concatenated matrix to obtain the matrix representing the encoded key.

A system including the encoder further includes a decoder deployed in one or more terminals, the decoder including the processor executing the program instructions, the processor configured to decode the encoded key from received matrix from the network using a rank distance metric. The decoder further includes of generating an estimate using a rank distance metric from the matrix received from the network. The decoder tests the rank of a second matrix generated using a first set of matrices that result from a reduction transformation of the matrix received by the network and a second set of full rank matrices that are derived by solving a set of equations using the first set of matrices.

Stated another way, the decoder un-concatenates the received matrix, which is a corrupted version of the matrix representing the encoded k-bit key, into k matrices. The decoder performs matrix operations including elementary row operations, matrix inversions and multiplications, on each of the k matrices. The ranks of the k resulting matrices are close to the ranks of the k matrices generated during the encoding phase. The decoder decodes the k-bit key by testing the rank of the k resulting matrices.

In another example aspect of disclosed invention, a method, includes generating a k-bit key, where k is a positive integer, estimating an upper bound of a number of eavesdropped links, encoding each bit of the k-bit key using a random matrix of a selected rank, and transmitting the encoded k-bit key through a network that performs linear operations on packets, including network coding operations.

In yet another example aspect of disclosed invention, a computer program product for encoding and decoding, the computer program product comprising a computer readable storage medium having program instructions embodied therewith, the program instructions readable and executable by a computer to cause the computer to generate a k-bit key, where k is a positive integer, estimate an upper bound of a number of eavesdropped links, encode each bit of the k-bit key using a random matrix of a selected rank, and transmit the encoded k-bit key through a network that performs linear operations on packets.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF DRAWINGS

The exemplary aspects of the invention will be better understood from the following detailed description of the exemplary embodiments of the invention with reference to the drawings.

DETAILED DESCRIPTION OF A PREFERRED EMBODIMENTS

The invention will now be described with reference to the drawing figures, in which like reference numerals refer to like parts throughout. It is emphasized that, according to common practice, the various features of the drawing are not necessary to scale. On the contrary, the dimensions of the various features can be arbitrarily expanded or reduced for clarity. Exemplary embodiments are provided below for illustration purposes and do not limit the claims.

Network coding systems is more flexible than classic store and forward networks in that nodes have the capability to mix information in packets using linear operations before forwarding them. The benefits are to maximize multicast/unicast throughput, improve robustness on packet losses and mobility, and can be implemented in a distributed manner. However, there are new security challenges. There can be adversarial errors where adversaries may be able to eavesdrop or inject errors in some links in the network. There can be pollution errors, where network coding systems are sensitive to errors which propagate due to the mixing of packets. Security challenges in network coding systems are addressed by error control schemes. However, most existing error control schemes for network coding systems assume secret keys are shared among network nodes. One of the problems addressed in this invention is how to share the secret keys in the first place. Existing key distribution schemes such as PKI or trusted third party typically require additional infrastructure and do not meet the requirements for network coding systems. On the other hand, existing information-theoretic key distribution schemes for network coding systems have the drawback of requiring prior knowledge on the exact network capacity, as well as prior knowledge on the exact number of network channels controlled by the adversary.

Thus, there is disclosed an end-to-end mechanism for a source to transmit information to a terminal confidentially and reliably, through a network in which the nodes employ linear network codes that are not known to the source and the terminal a priori. Unlike previous approaches, the disclosed scheme operates in a rateless manner, i.e., the scheme does not require knowledge of the network capacity and only require coarse estimation of the capability of the adversary. One of the many features of the disclosed invention is that one bit of information is represented by the rank of a matrix transmitted. To send a bit of 0, a low-rank matrix is generated and transmitted. In order to send a bit of 1, a full-rank matrix is generated and transmitted. The adversary sees only a limited number of edges and therefore cannot distinguish which bit is sent.

The adversary can modify only a limited number of edges and so has limited capability to change the rank of the transmitted matrix. Therefore the terminal, by testing the rank of the received matrix, can distinguish the bits. In addition, by choosing the rank of the low-rank matrix carefully, the scheme operates in a rateless manner, i.e. without needing to know the exact network capacity and the exact number of network channels controlled by the adversary. One of the many example advantages is that the disclosed scheme does not require any additional resources and infrastructure. Another advantage is that the disclosed scheme is end-to-end and does not require any collaboration from intermediate network nodes. Another advantage is that the disclosed scheme does not require prior knowledge of the network capacity and the number of network channels controlled by the adversary.

Figure 1:
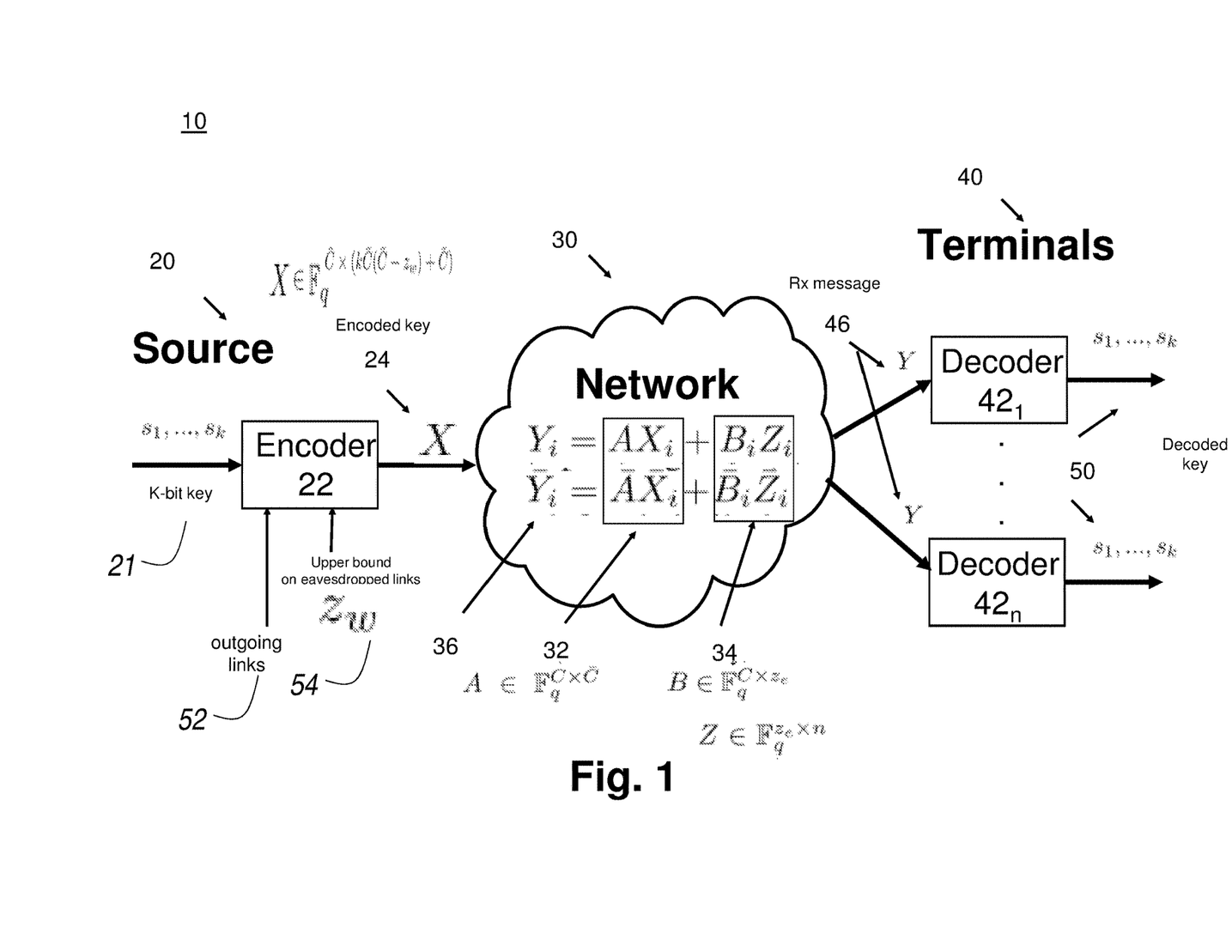
FIG. 1 illustrates a system for key distribution in an example embodiment.

Therefore, referring to FIG. 1, there is disclosed a method for efficient and practical key distribution in network coding systems. The system 10 setup is as follows. A source 20 wishes to distribute a k-bit key 21 (k is a positive integer) to multiple terminals 40, where the network 30 has capacity C. The adversary can insert errors on $z_e$ network links and can eavesdrop on $z_w$ network links 54. $z_w$ 54 is upper bounded and $z_e+z_w<C$. The eavesdropper would be eavesdropping on the network 30. The network 30 can be a black box (viewed in terms of its input and output). It can be assumed that source 20 and terminals 40 do not know the network coding scheme, C (capacity) or $Z_e$ (network links). Reference 52 is the number of out-going edges of the source $\overline{C}$, which is an upper bound of the network capacity C. References 52 and 54 are located under encoder 22 to show that references 52 and 54 are the inputs to encoder 22.

In addition to upper bound on eavesdropped links, the system 10 also takes as input an upper bound on the network capacity which is easily estimate as the number of outgoing network links from the source network node where the encoder resides $\hat{C}$. The disclosed scheme is adaptive. In other words, the scheme adapts to the dynamics of the network 30 and the adversary and makes sure that the key is securely and reliably delivered regardless of the dynamics.

The scheme is rateless and adaptive. A rateless scheme provides, for example, that the scheme does not require knowledge of the network capacity (only an upper bound of capacity easily computed at the source with local info) and only require coarse estimation of the capability of the adversary (i.e., upper bound on number eavesdropped links).

The scheme is made adaptive, for example, since there is a separate method that can accurately determine the parameters C, $z_e$ and $z_w$, even in a dynamic setting. The disclosed scheme can perform, for example, when $z_w<=z_{w'}<=C-z_e$, where $z_{w'}$ is the estimate, and $z_w$, C, $z_e$ are the true parameters that one does not know. One may also assume that honest nodes dominate the network and so the gap between $z_w$ and C-$z_e$ is quite large (recall that $z_w=C-z_e$ corresponds to the case that the adversary controls the min-cut), and so that the disclosed scheme has a big margin for estimation error. Another way to see it is that the disclosed scheme works over a large "dynamic range" without the need to revise parameters, whereas if other schemes were used, then one needs to revise parameters very often.

The disclosed invention is able to distribute the k-bit key 21 in-band using the network coding system 10. The source encoder 22 can represent each bit by a random matrix and send over network 30, where "0" can represent a low rank random matrix, and "1" can represent a full rank random matrix.

The adversary sees only a limited number of edges (network links) $z_w$ 54 and cannot distinguish which bit is sent, and has limited capability $z_e$ 52 to change the rank of the transmitted matrix. The terminal decoder 42 ($42_1 \ldots 42_n$, where n is an integer) can distinguish the bits by testing the rank of the received matrix.

In the disclosed invention, there is no requirement for additional resources and infrastructure for key distribution. There is no requirement for collaboration from intermediate network nodes, and no prior knowledge of the network coding scheme, the network capacity and number of network channels controlled by the adversary.

If encoder 22 and decoder(s) 42 are available, then the system 10 uses a network emulator to create different test scenarios with controlled network topologies and capacities C, and adversary parameters $z_w$, $z_e$.

If there is access to the encoder output, the detection would not be difficult. Particularly, there can be a check of the rank of the submatrices of X corresponding to the $W_i$'s. The ranks of these submatrices are very structured, i.e., either full rank or rank $Z_w$ as explained in more detail below.

If there is a control of the min-cut of the network, then the system can listen to the cut edges. One of the problems with all existing codes is that they require the knowledge of the min-cut (minimum cut value) of the network, and the number of errors in advance, for the purpose of code construction, encoding and decoding. A small set of packets received from any small number of edges ($<=z_w$) looks uniformly random, but a large set of packets from a large set of edges ($>z_w$) looks less random (recall that we generate a lot of zero matrices that have no entropy). Therefore, the system can test the entropy of the packets and check if they exhibit this property.

A system can be provided for efficient and rateless error correction for network coding provided that the source 20 and the terminal 40 share a short secret key 21. The key 21 may be pre-allocated, communicated by a secure side-channel, or communicated over the network 30 by using public key infrastructure while disabling network coding. The question is, if the above options are not available, is it possible to communicate the key via the same network coding system. The disclosed invention shows that this is possible in the following details.

An information-theoretic scheme of a system 10 to communicate a short key 21 secretly and reliably over the network 30, provided that the adversary has limited eavesdropping capability. Specifically, instead of allowing the adversary to observe all edges in the network, one assumes that the adversary can eavesdrop on at most a number of $z_w$ edges in the network 30, such that $z_e+z_w<C$. One can assume that the source 20 has an upper bound on the passive parameter $z_w$, and assume that $z_e$ and C are not known to the source 20 and the terminal 40. The present scheme operates in a rateless manner.

One of the ideas is that one bit of information is represented by the rank of a matrix transmitted. To send a bit of 0, a low-rank matrix is generated and transmitted. To send a bit of 1, a full-rank matrix is generated and transmitted. The adversary sees only a limited number of edges and therefore cannot distinguish which bit is sent. The adversary has limited capability to change the rank of the transmitted matrix and therefore the terminal, by testing the rank of the received matrix, can distinguish the bits. In the following, the detailed encoder and decoder to transmit k bits secretly and reliably is described.

Referring again to FIG. 1, a system 10 is shown including a source 20, network 30 and destinations (terminals) 40. The network 30 can be represented as a directed graph, where the set of vertices represents network nodes and the set of edges represents noiseless network links. The network operates in a synchronized manner and each link can send a symbol from a finite field per transmission. A source 20 wishes to communicate reliably to a terminal 40. The linear network code C is a set of encoding functions defined over each edge. Each function takes as input the signals received from all incoming edges at one end, and evaluates to the signal transmitted over the edge.

To transmit information over the network 30, the source 20 generates a batch of encoded packets as input to the network 30, represented by a matrix X, where packets are rows. As the packets travel through the network 30, they undergo linear transforms defined by the network code $\mathcal{C}$. Without loss of generality, it is assumed $\mathcal{C}$ is capacity-achieving, i.e., in the absence of adversarial errors 34, the terminal will observe a matrix AX 32 (linear operations on packets including network coding operations), where A is the network transform matrix. Note that when there are multiple terminals, a network transform matrix is defined for each terminal and these matrices need not to be the same. Therefore, when there are multiple terminals, each of them receives different messages because the network transform matrix for each of them is different. i.e., "A" can be different for different terminals.

The adversary controls a subset of edges in the network 30, modeled in the following way. For each compromised edge, the adversary injects an error packet so that the packet received from this edge is the addition of the error packet and the packet originally transmitted on the edge. As the injected error packets travel through the network 30, they undergo linear transformations defined by the network code $\mathcal{C}$. The terminal receives the sum of the linearly transformed error packets and the linearly transformed X. More precisely, the terminal observes a matrix Y=AX+BZ (36), where B is the network transforming matrix (determined by the network code) from the compromised edges to terminal, and Z are the injected error packets. From the network 30, a receive Rx Message 46 (i.e., $Y_i$, where i is an integer) is sent to decoder $42_1$ to decoder $42_n$. In the key distribution scheme there is no need to note a period since everything finishes within just one period.

Therefore, a k-bit key $s_1 \ldots, s_k$ is received or used by the encoder 22, which then generates transmit encoded key X 24, which are sent to the network 30. Let $\overline{C}$ be an upper bound of the network capacity C, i.e., the min-cut from the source to the terminals. For example, one can choose $\overline{C}$ to be the number of out-going edges of the source. Let $z_w$ be an upper bound of the number of edges that is controlled by the adversary. The encoded key X 24 is such that $$X \in \mathbb{F}_q^{\overline{C} \times (k\overline{C}(\overline{C}-z_w)+\overline{C})}$$

(i.e., a matrix of a size over $\mathbb{F}_q$). $\mathbb{F}_q$ is the finite field of size q of symbols transmitted as data over the network 30.

From the network 30, a receive Rx Message 46 (i.e., $Y_i$) is sent to decoder $42_1$ is received by decoder $42_n$. The decoders (decoders $42_1$ to $42_n$, where n is a positive integer) then output decoded key $s_1 \ldots, s_k$ 50. Outgoing links $z_e$ 52 and upper bound on eavesdropped links $z_w$ 54 are received at encoder 22.

In further detail, the network 30 can be represented as a directed graph $\mathcal{G}=(\mathcal{V}, \mathcal{E})$, where the set of vertices $\mathcal{V}$ represents network nodes and the set of edges $\mathcal{E}$ represents noiseless network links. Denote by C the min-cut (or max-flow) of the network with respect to s and t. The linear network code $\mathcal{C}$ implemented in $\mathcal{G}$ is represented by a set of encoding functions $\mathcal{C}$. For each compromised edge (u; v), the adversary injects an error packet so that the packet received by v from this edge is the addition of the error packet and the packet originally transmitted on the edge. The terminal 40 observes a matrix Y=AX+BZ, where B is the network transform matrix (determined by the network code) from the compromised edges to t, and Z are the $z_e$ injected error packets. The adversary may choose Z carefully in order to corrupt the communication between s and t. Note that $z_e$, Z and B are not known to the source 20 and the terminal 40. The network 30 shows the matrix Y=AX+BZ with the network coding operations 32 (AX) and the adversarial error 34 (BZ).

The adversary controls $z_e$<C edges in the network 30, modeled in the following way. For each compromised edge (u, v), the adversary injects an error packet so that the packet received by v from this edge is the addition (over $\mathbb{F}_q$, (finite field)) of the error packet and the packet originally transmitted on the edge. As the injected error packets travel through the network 30, they undergo linear transforms defined by the network code $\mathcal{C}$. The terminal 40 receives the sum of the linearly transformed error packets and the linearly transformed X. More precisely, the terminal 40 observes a matrix Y=AX+BZ, where $B \in \mathbb{F}_q^{C \times Z_q}$ is the network transform matrix (determined by the network code) from the compromised edges to t, and $Z \in \mathbb{F}_q^{Z_e \times n}$ are the $z_e$ injected error packets. The adversary may choose Z carefully in order to corrupt the communication between s (source 20) and t (terminal 40). Note that $z_e$, Z and B are not known to the source 20 and the terminal 40.

Therefore, as indicated previously, one bit of information is represented by the rank of a matrix transmitted. To send a bit of 0, a low-rank matrix is generated and transmitted; and to send a bit of 1, a full-rank matrix is generated and transmitted. This is because the adversary sees only a limited number of edges and therefore cannot distinguish which bit is sent. The adversary has limited capability to change the rank of the transmitted matrix and therefore the terminal, by testing the rank of the received matrix, can distinguish the bits. The following describes the detailed encoder 22 and decoder 42 to transmit k bits secretly and reliably.

Figure 2:
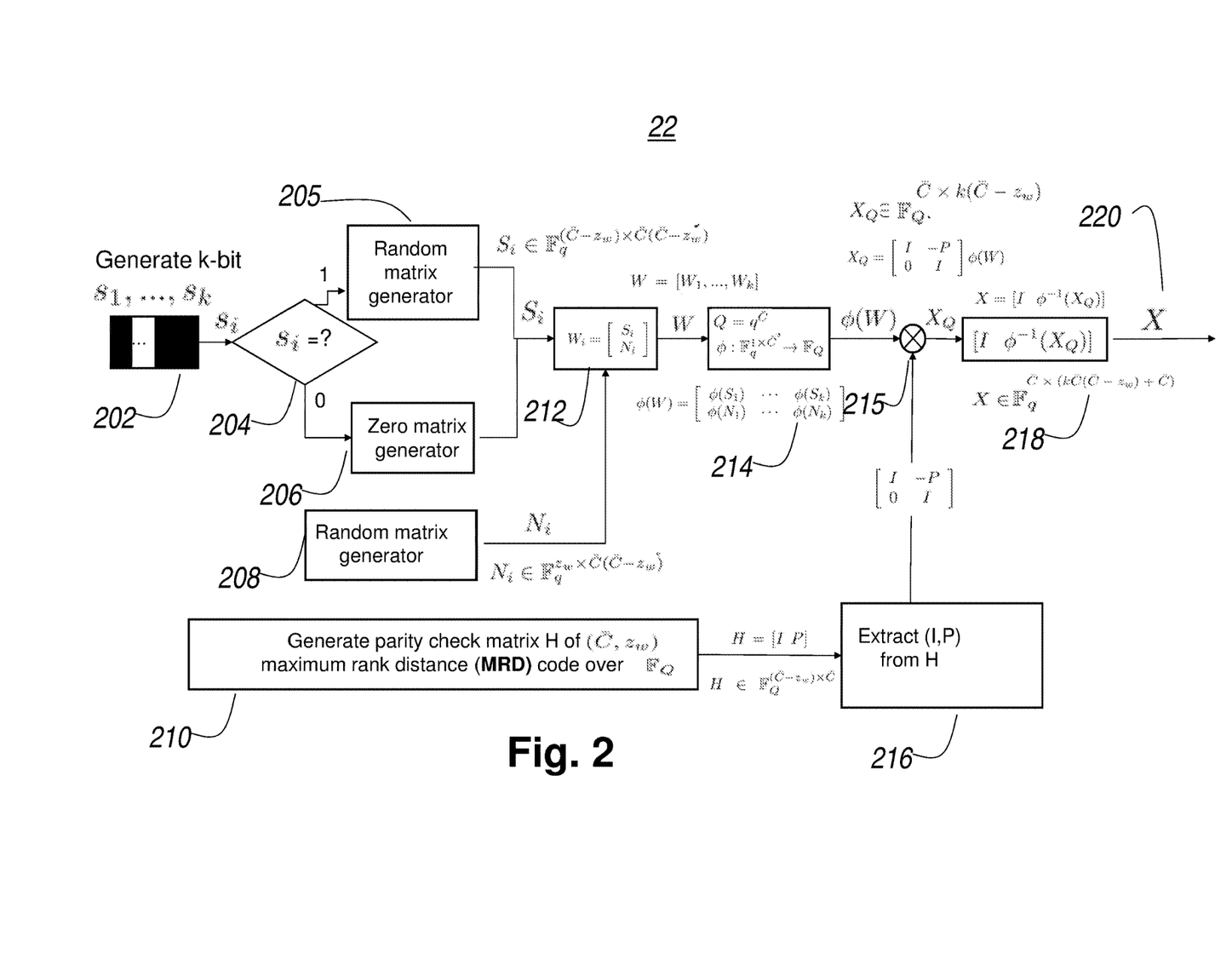
FIG. 2 illustrates further detail of an encoder with key distribution in an example embodiment.

Referring to FIG. 2, the encoding 22 is further detailed. The encoder 22 produces streams of encoded packets using random linear codes.

A k-bits key 202 is generated by the system 10. Therefore, one can denote the k bits to be transmitted by $s_1, \ldots, s_k$ 202. Therefore, a key $s_i$ is received by the encoder, where i is a positive integer (k is ≥1). At module 204, if the key $s_i$ is 1, then it is sent to a random matrix generator 205. If the key is 0, then the key $s_i$ is sent to the Zero matrix generator 206.

For each of the bits of the key 202, a matrix $$S_i \in \mathbb{F}_q^{(\overline{C}-z_w) \times \overline{C}(\overline{C}-z_w)}$$

is generated from the random matrix generator 205. $S_i$ is a zero matrix if $s_i$=0 (from zero matrix generator 206) or a random matrix if $s_i$=1 (from random matrix generator 205). Let $$N_i \in \mathbb{F}_q^{(z_w) \times \overline{C}(\overline{C}-z_w)}$$

be a random matrix, $$W_i = \begin{bmatrix} S_i \\ N_i \end{bmatrix},$$

and W=[$W_1, \ldots W_k$] at module 212 when Si is received from generators 205 and 206 and $N_i$ is received from random matrix generator 208 (where i is an integer). The separate random matrix generator 208 outputs $N_i$ where $$N_i \in \mathbb{F}_q^{z_w \times \overline{C}(\overline{C}-z_w)}.$$

The module 208 outputs W to module 214 where the universal network code is applied. Let $Q=q^{\overline{c}}$ and let $\mathbb{F}_Q$ be the degree $\overline{C}$ extension field of $\mathbb{F}_Q$. $\mathbb{F}_Q$ is a vector space over $\mathbb{F}_q$ and let $\varphi$:

$$\mathbb{F}_q^{1 \times \overline{C}} \to \mathbb{F}_Q$$

be the vector space isomorphism. Then let $\varphi(S_i)$ and $\varphi(N_i)$ denote the matrices obtained by applying the vector space isomorphism $\varphi$ to each row of $S_i$ or $N_i$, so that each length-$\overline{C}$ row segment maps to a symbol $\mathbb{F}_Q$. Further, $\varphi(W)$ is denoted as:

$$\varphi(W) = \begin{bmatrix} \varphi(S_1) & \ldots & \varphi(S_k) \\ \varphi(N_1) & \ldots & \varphi(N_k) \end{bmatrix}$$

$\varphi(W)$ is outputted from module 214 and a product (matrix multiplication) 215 is generated from $\varphi(W)$ and the output $$\begin{bmatrix} I & -P \\ 0 & I \end{bmatrix}$$

from module 216.

The output from module 216 is explained further as follows. Let $H \in \mathbb{F}_Q^{(\overline{C}-z_w) \times \overline{C}}$ be a parity check matrix of a ($\overline{C}, z_w$) maximum rank distance (MRD) code over $F_Q$. Therefore, module 210 generates parity check matrix H of a ($\overline{C}, z_w$) maximum rank distance (MRD) code over $\mathbb{F}_Q$ Without loss of generality one may assume H=[I P], which is output from the module 210. At module 216, (I,P) is extracted from H to output the matrix $$\begin{bmatrix} I & -P \\ 0 & I \end{bmatrix}.$$

Then $X_Q$ is output from the product (matrix multiplication) 215 of the matrix $$\begin{bmatrix} I & -P \\ 0 & I \end{bmatrix}$$

derived from the check parity matrix 210 and the matrix $\varphi(W)$ derived from k-bit key 202.

The source 20 then computes:

$$X_Q = \begin{bmatrix} I & -P \\ 0 & I \end{bmatrix} \varphi(W),$$

where $X_Q$ is a $\overline{C} \times k(\overline{C}-z_w)$ matrix over $\mathbb{F}_Q$ from the product 215. Finally, the encoder obtains at module 218 from the received input $X_Q$:

$$X=[I\varphi^{-1}(X_Q)],$$

where X is a $\overline{C} \times (k\overline{C}(\overline{C}-z_w)+\overline{C})$ matrix over $\mathbb{F}_q$ since $\varphi^{-1}$ expends each entry of $X_Q$ into a length-$\overline{C}$ row vector over $\mathbb{F}_q$. Finally, the source inputs X into the network 30 and thereafter it undergoes the network transforms.

Figure 3:
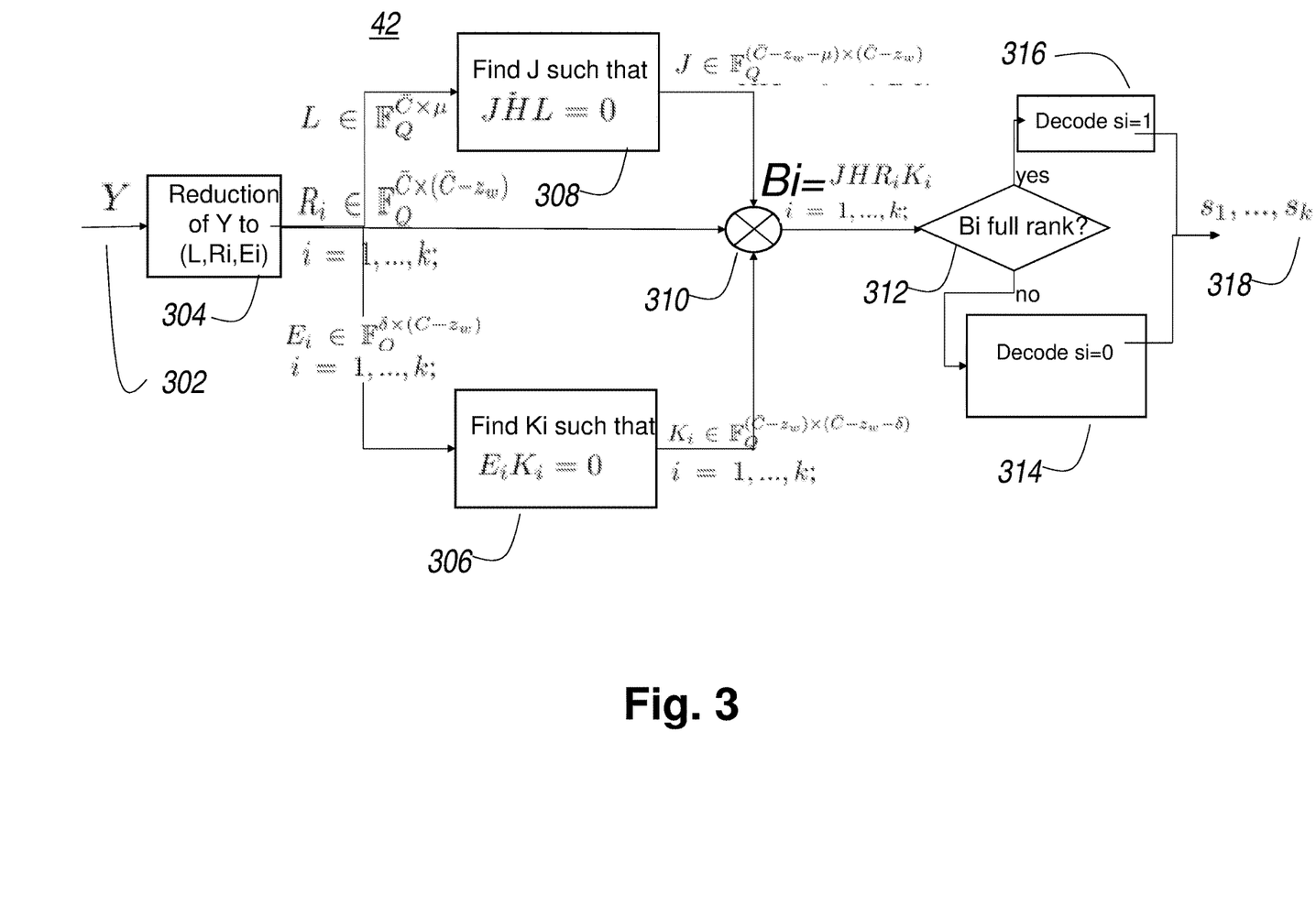
FIG. 3 illustrates further detail of a decoder with key distribution in an example embodiment.

Referring to FIG. 3, the decoder(s) 42 is further described. The terminal 40 observes a batch of packets from the network 30 Y=AX+BZ. One of the objectives of the decoder 42 is to obtain from Y (302) a good estimation of $X_Q$, such that it is close to $X_Q$ in rank distance. The decoder 42 can accomplish this by performing a reduction transformation on Y 302 at module 304, which essentially involves a row reduction on Y 302 and an insertion of zero rows. Therefore, at module 304 there is reduction of Y to $(L, R_i, E_i)$. From this the decoder 42 will obtain a matrix $L \in \mathbb{F}_Q^{\overline{C} \times \mu}$; a set of matrices $R_i \in \mathbb{F}_Q^{\overline{C} \times (\overline{C}-z_w)}$, i=1, k; and a set of matrices $E_i \in \mathbb{F}_Q^{\delta \times (\overline{C}-z_w)}$, i=1, k. These matrices are useful because they are related to $X_Q$ in the following way. Divide $X_Q$ into $[X_1 \ldots X_k]$ where $X_i$ is a $\overline{C} \times (\overline{C}-z_w)$ matrix over $\mathbb{F}_Q$, then by a theorem, there exist matrices $U_{L,i}, U_{E,i}$ and $U_i$ such that rank $(U_i) \leq z_e - \max\{\mu+C-\overline{C},\delta\}$, and such that $$R_i = X_i + LU_{L,i} + U_{E,i}E_i + U_i.$$

To decode, the terminal 40 solves for full rank matrices $J \in \mathbb{F}_Q^{(\overline{C}-z_w-\mu) \times (\overline{C}-z_w)}$ at module 308 and $K_i \in \mathbb{F}_Q^{(\overline{C}-z_w) \times (\overline{C}-z_w-\delta)}$ at module 306 such that JHL=0 and $E_iK_i=0$. Therefore, at module 308, the decoder 42 finds J such that JHL=0 at module 306, the decoder 42 finds $K_i$ such that $E_iK_i=0$. A product 310 is performed of the output of module 308, 304 and 306 to output matrix $B_i=JHR_iK_i$ where i=1, ..., k (where k is positive integer).

Finally, the decoder 42 tests at module 312 the rank of the matrix $B_i=JHR_iK_i$ and decodes $s_i=1$ if the matrix $B_i$ is full rank at module 316 or $s_i=0$ at module 314 otherwise. Thereby, the key $s_1, \ldots, s_k$ 318 is output from the decoder(s) 42.

Figure 4:
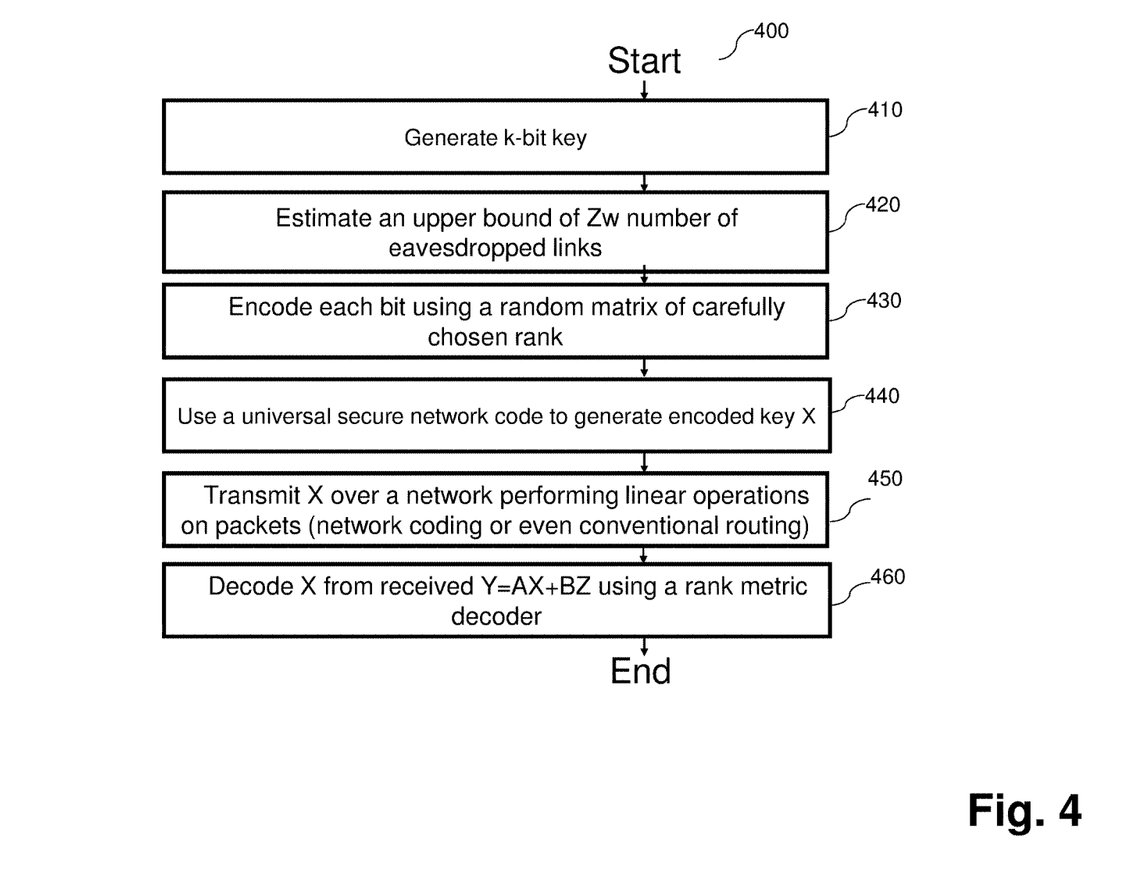
FIG. 4 a flow chart of a system for key distribution in an example embodiment.

FIG. 4 provides a flow chart of the method of system of distributing keys 10 according to an example embodiment. With reference to FIGS. 1 through 4, the system 10 generates k-bit key 24 (step 410). Then, after receiving the k-bit key 24 by the encoder 24, the system 10 provides an estimation of an upper bound 54 of $Z_w$ number of eavesdropped links (step 420). Then the encoder 22 encodes each bit of the k-bit key 24 using a random matrix of carefully chosen rank (step 430). Then, the encoder 22 uses a universal secure network code to generate encoded key X 220 (step 440). Then, the encoder 22 transmits X over a network 30 performing linear operations on packets (including network coding operations or even store and forward routing operations) (step 450). Then, the decoder(s) 42 decode X from received Y=AX+BZ using a rank metric decoder (step 460). Thereby, the key $s_1, \ldots, s_k$ 318 is output from the decoder(s) 42.

Exemplary Hardware and Cloud Implementation

Figure 5:
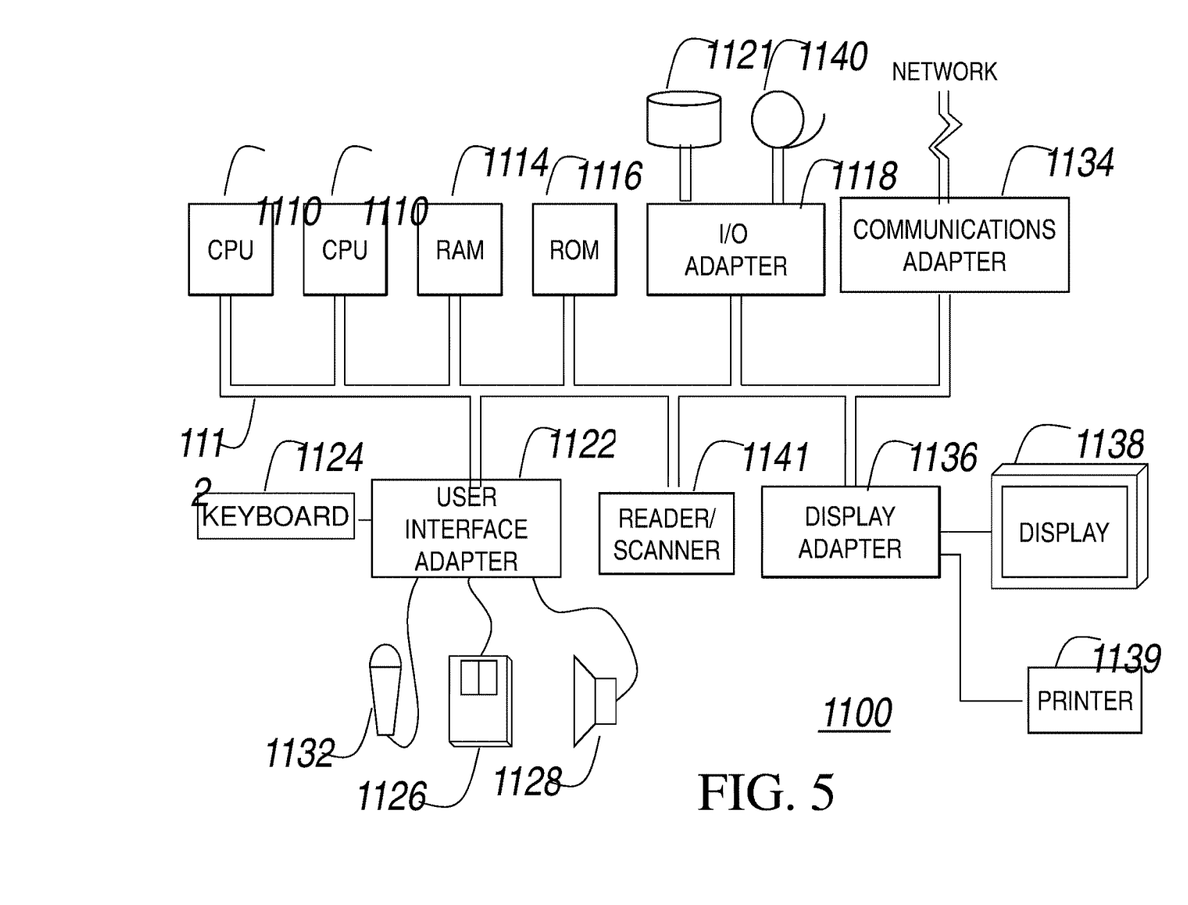
FIG. 5 illustrates an exemplary hardware/information handling system for incorporating the exemplary embodiment of the invention therein.

FIG. 5 illustrates another hardware configuration of an information handling/computer system 1100 in accordance with the disclosed invention and which preferably has at least one processor or central processing unit (CPU) 1110 that can implement the techniques of the invention in a form of a software program.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing storage media tangibly embodying a program of machine-readable instructions executable by a digital data processor incorporating the CPU 1110 and hardware above, to perform the method of the invention.

This signal-bearing storage media may include, for example, a RAM contained within the CPU 1110, as represented by the fast-access storage for example.

Figure 6:
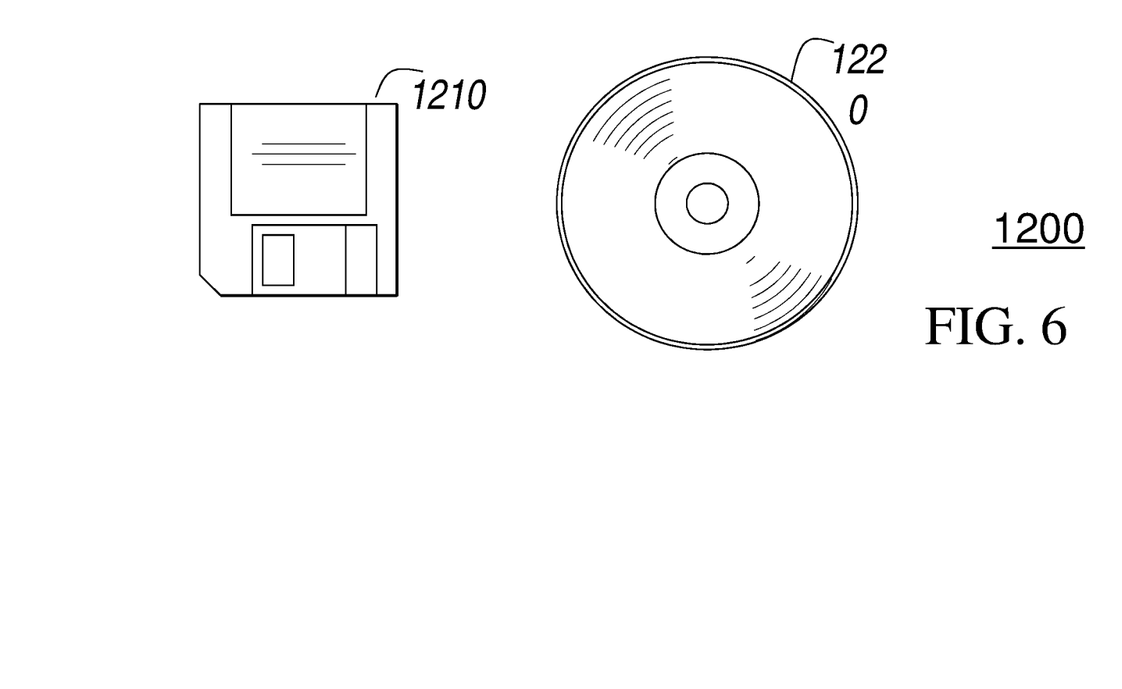
FIG. 6 illustrates a signal-bearing storage medium for storing machine-readable instructions of a program that implements the method according to the exemplary embodiment of the invention.

Alternatively, the instructions may be contained in another signal-bearing storage media 1200, such as a magnetic data storage diskette 1210 or optical storage diskette 1220 (FIG. 6), directly or indirectly accessible by the CPU 1210.

Whether contained in the diskette 1210, the optical disk 1220, the computer/CPU 1210, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
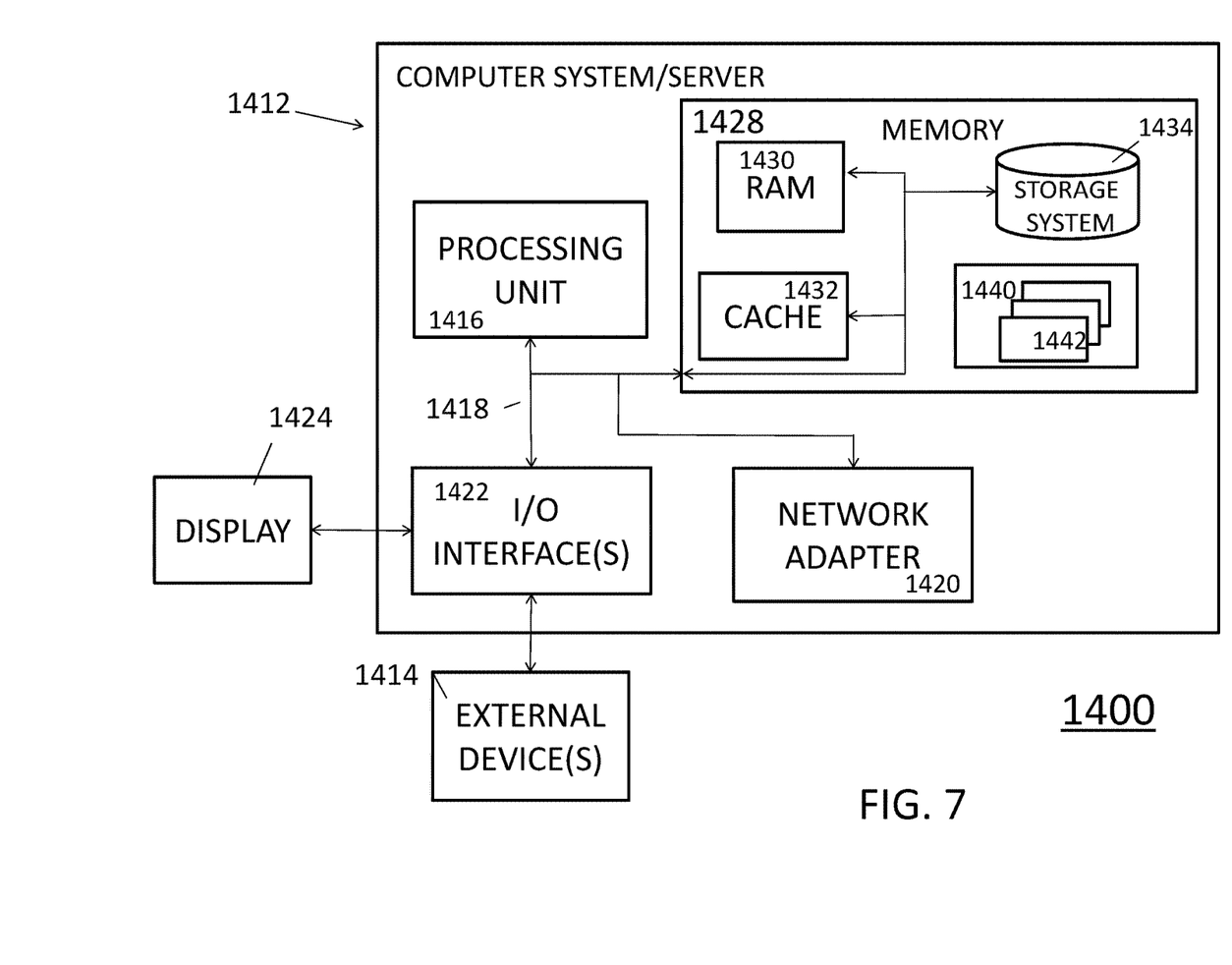
FIG. 7 depicts a cloud computing node according to an embodiment of the present invention.

Referring now to FIG. 7, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove.

In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 1412 in cloud computing node 1400 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 8:
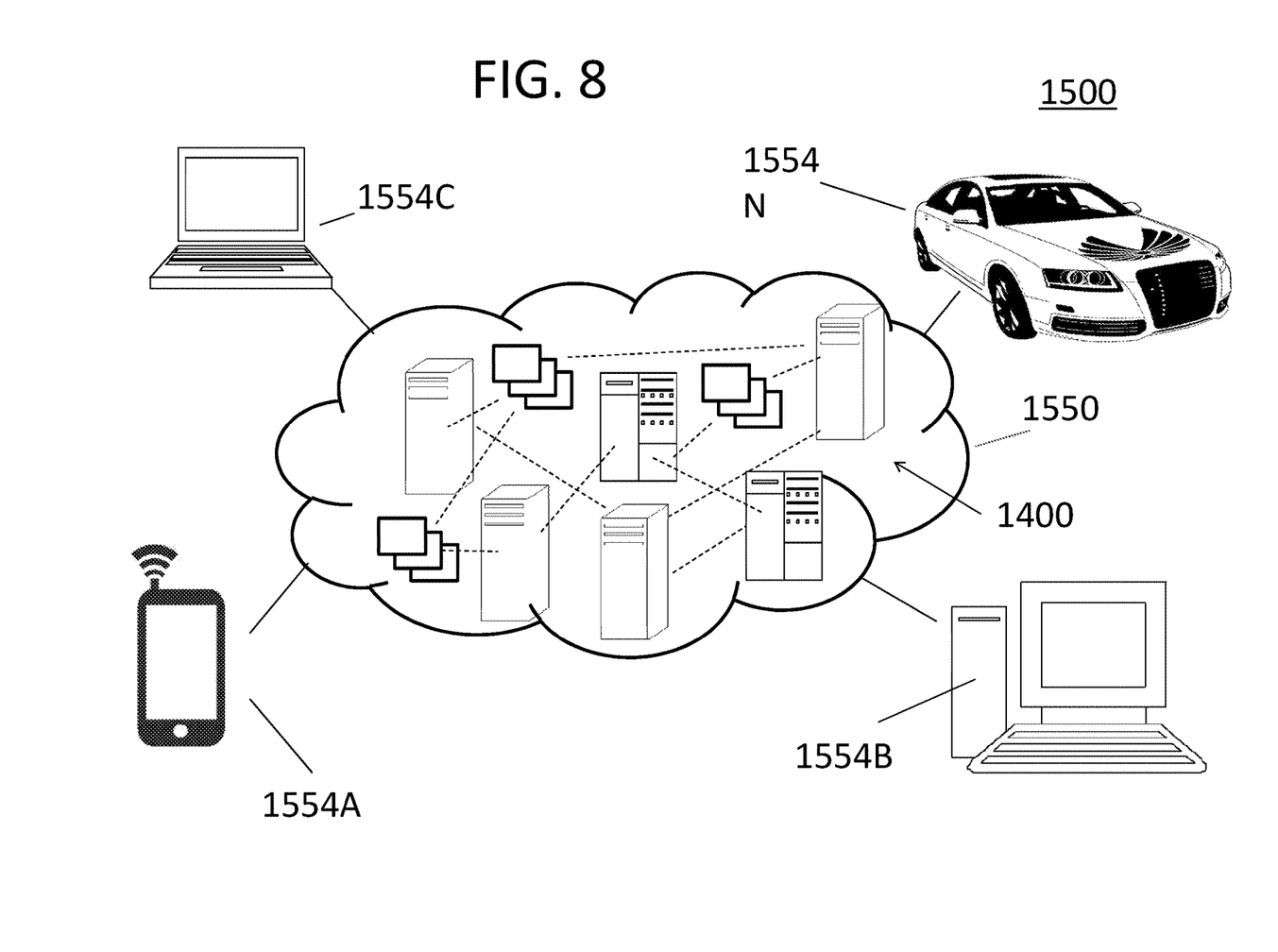
FIG. 8 depicts a cloud computing environment according to an embodiment of the present invention.

Referring now to FIG. 8, illustrative cloud computing environment 1550 is depicted. As shown, cloud computing environment 1550 comprises one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 8 are intended to be illustrative only and that computing nodes 1400 and cloud computing environment 1550 can communicate with any type of computerized device over any type of network and/or network addressable connection (e.g., using a web browser).

Figure 9:
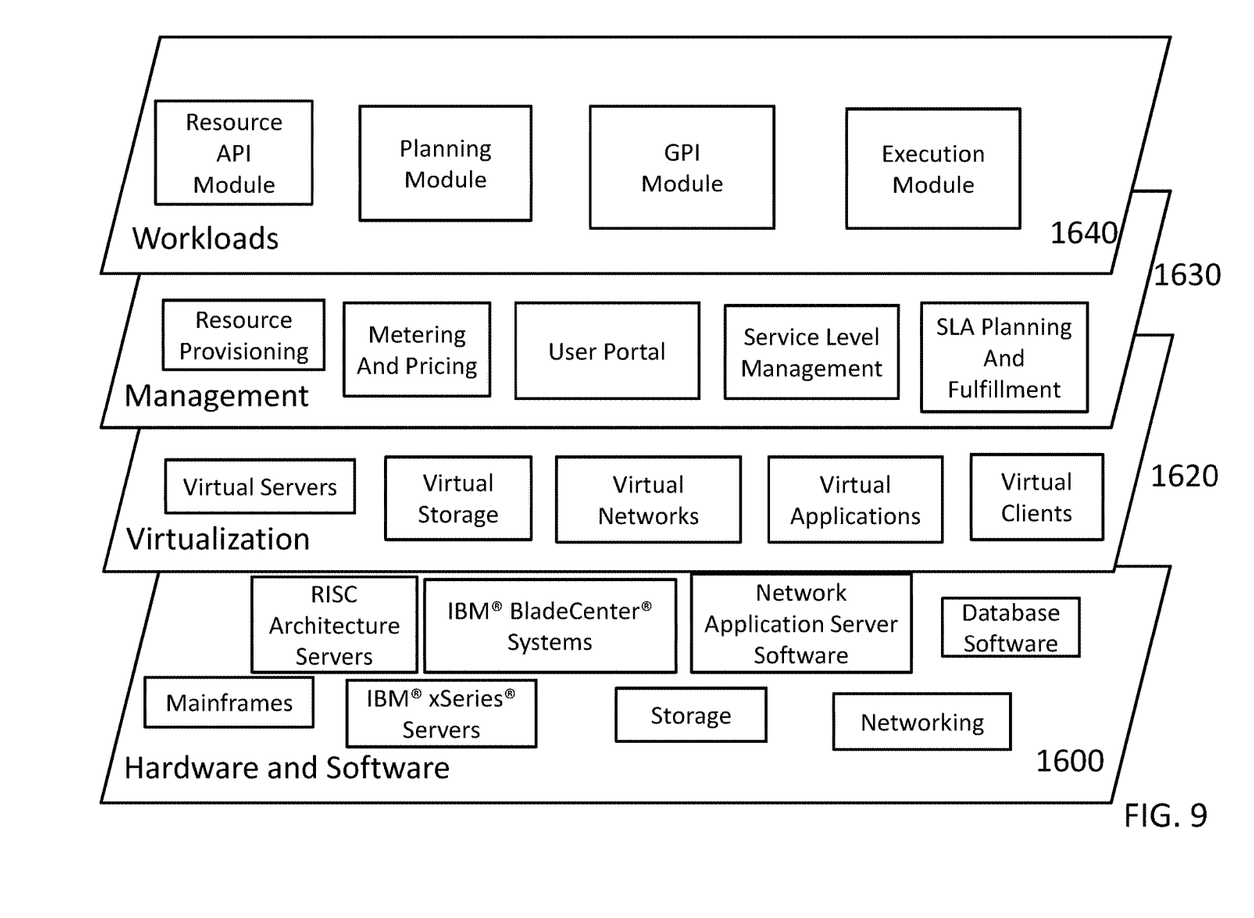
FIG. 9 depicts abstraction model layers according to an embodiment of the present invention.

Referring now to FIG. 9, a set of functional abstraction layers provided by cloud computing environment 1550 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 1660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1662 provides an abstraction layer from which the following examples of virtual entities may be provided: virtual servers; virtual storage; virtual networks, including virtual private networks; virtual applications and operating systems; and virtual clients.

In one example, management layer 1664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1666 provides examples of functionality for which the cloud computing environment may be utilized. Examples of workloads and functions which may be provided from this layer include such functions as mapping and navigation; software development and lifecycle management; virtual classroom education delivery; data analytics processing; transaction processing; and, more particularly relative to the disclosed invention, the APIs and run-time system components of generating search autocomplete suggestions based on contextual input.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An encoder comprising:
a non-transitory computer readable storage medium storing program instructions; and
a processor executing the program instructions, the processor configured to:
generate a k-bit key, where k is a positive integer;
estimate a network capacity;
encode each bit of the k-bit key using a random matrix of a selected rank and the estimated network capacity; and
transmit the encoded k-bit key through a network that performs linear operations on packets including network coding operations or store and forward routing operations, such that the k-bit key is protected against adversaries within the network,
wherein the estimate of the network capacity includes estimating an upper bound of a number of eavesdropped links.

2. The encoder according to claim 1, wherein the processor is further configured to:
use a universal secure network code to generate the encoded key,
wherein the estimate of the network capacity includes estimating the upper bound of the number of eavesdropped links including determining a number of outgoing edges of a source as an upper bound of the network capacity.

3. The encoder according to claim 1, wherein the processor is further configured to generate the random matrix from a first matrix generated from the k-bit key and a second matrix generated without the k-bit key.

4. The encoder according to claim 1, wherein one bit of information of the k-bit key is represented by a rank of a matrix of the encoded k-bit key that is transmitted.

5. The encoder according to claim 1, wherein depending on a state of a bit of the k-bit key, the bit is sent by the processor to either a random matrix generator or a zero matrix generator, wherein the transmitting of the encoded k-bit key through a network is such that the k-bit key is protected within the network.

6. The encoder according to claim 1, wherein the processor is further configured to:
generate a parity check matrix of a maximum rank distance code; and
perform a product of an output of a random matrix generator and a zero matrix generator.

7. A system comprising the encoder according to claim 1, further comprising a decoder deployed in one or more terminals, the decoder comprising:
a second processor executing the program instructions, wherein the second processor is configured to:
decode the encoded key from a received matrix from the network using a rank metric.

8. The system according to claim 7, wherein the second processor is configured to generate an estimate using a rank metric from the matrix received from the network.

9. The system according to claim 7, wherein the second processor is configured to test a rank of a second matrix from a reduction of the matrix from the network in order to output the decoded key.

10. A method, comprising:
generating a k-bit key, where k is a positive integer;
estimating a network capacity;
encoding each bit of the k-bit key using a random matrix of a selected rank and the estimated network capacity; and
transmitting the encoded k-bit key through a network that performs linear operations on packets, such that the k-bit key is protected against adversaries within the network,
wherein the estimating of the network capacity includes estimating an upper bound of a number of eavesdropped links.

11. The method according to claim 10, further comprising: using a universal secure network code to generate the encoded key,
wherein the estimate of network capacity includes estimating the upper bound of the number of eavesdropped links including determining a number of out-going edges of a source as an upper bound of the network capacity.

12. The method according to claim 10, wherein one bit of information of the k-bit key is represented by a rank of a matrix of the encoded k-bit key that is transmitted.

13. The method according to claim 10, wherein depending on a state of a bit of the k-bit key, the bit is sent to either a random matrix generator or a zero matrix generator.

14. The method according to claim 10, further comprising:
generating a parity check matrix of a maximum rank distance code; and
performing a product of an output of a random matrix generator and a zero matrix generator.

15. The method according to claim 10, further comprising:
decoding the encoded key from received matrix from the network using a rank metric.

16. The method according to claim 15, the method further comprising:
generating an estimate using a rank metric from the matrix received from the network; and
testing a rank of a second matrix from a reduction of the matrix from the network in order to output the decoded key.

17. A computer program product for encoding and decoding, the computer program product comprising a non-transitory computer readable storage medium having program instructions embodied therewith, the program instructions readable and executable by a computer to cause the computer to:
generate a k-bit key, where k is a positive integer;
estimate a network capacity;
encode each bit of the k-bit key using a random matrix of a selected rank and the estimated network capacity; and
transmit the encoded k-bit key through a network that performs linear operations on packets, such that the k-bit key is protected against adversaries within the network,
wherein the estimate of the network capacity includes estimating an upper bound of a number of eavesdropped links.

18. The computer program product according to claim 17, the program instructions further causing the computer to use a universal secure network code to generate the encoded key,
wherein the estimate of network capacity includes estimating the upper bound of the number of eavesdropped links including determining a number of out-going edges of a source as an upper bound of the network capacity.

19. The computer program product according to claim 17, wherein one bit of information of the k-bit key is represented by a rank of a matrix of the encoded k-bit key that is transmitted,
wherein depending on a state of a bit of the k-bit key, the bit is sent to either a random matrix generator or a zero matrix generator, and
wherein,
the program instructions further causing the computer to decode the encoded key from received matrix from the network by using a rank metric.

* * * * *